United States Patent [19]

Groba

[11] Patent Number: 4,676,021

[45] Date of Patent: Jun. 30, 1987

[54] PORTABLE FIREARM SUPPORT

[76] Inventor: Ronald E. Groba, 2211 Pine Dr., Friendswood, Tex. 77546

[21] Appl. No.: 885,417

[22] Filed: Jul. 14, 1986

[51] Int. Cl.[4] .............................................. F41C 29/00
[52] U.S. Cl. ...................................................... 42/94
[58] Field of Search ........................... 42/94; 89/37.04; 248/188.5, 529, 533, 165, 439

[56] References Cited

U.S. PATENT DOCUMENTS

| | | | |
|---|---|---|---|
| 879,052 | 2/1908 | Jeranek | 42/94 |
| 1,890,423 | 12/1932 | Teagarden | 42/94 |
| 3,007,581 | 11/1961 | Moore | 42/94 |
| 3,327,422 | 6/1967 | Harris | 42/94 |
| 4,012,861 | 3/1977 | Gellatly | 43/15 |
| 4,089,423 | 5/1978 | Gorham et al. | 211/64 |
| 4,345,398 | 8/1982 | Pickett | 42/94 |
| 4,393,614 | 7/1983 | Pickett | 42/94 |
| 4,438,581 | 3/1984 | LaValle | 42/94 |
| 4,535,559 | 8/1985 | Hall | 42/94 |
| 4,575,964 | 3/1986 | Griffin | 42/94 |

Primary Examiner—Charles T. Jordan
Attorney, Agent, or Firm—Kenneth H. Johnson

[57] ABSTRACT

A portable firearm support or rest comprising two telescoping tubes with a firearm receiving means at the upper end and a latch means to engage and releasably hold the two tubes in an extended position.

20 Claims, 6 Drawing Figures

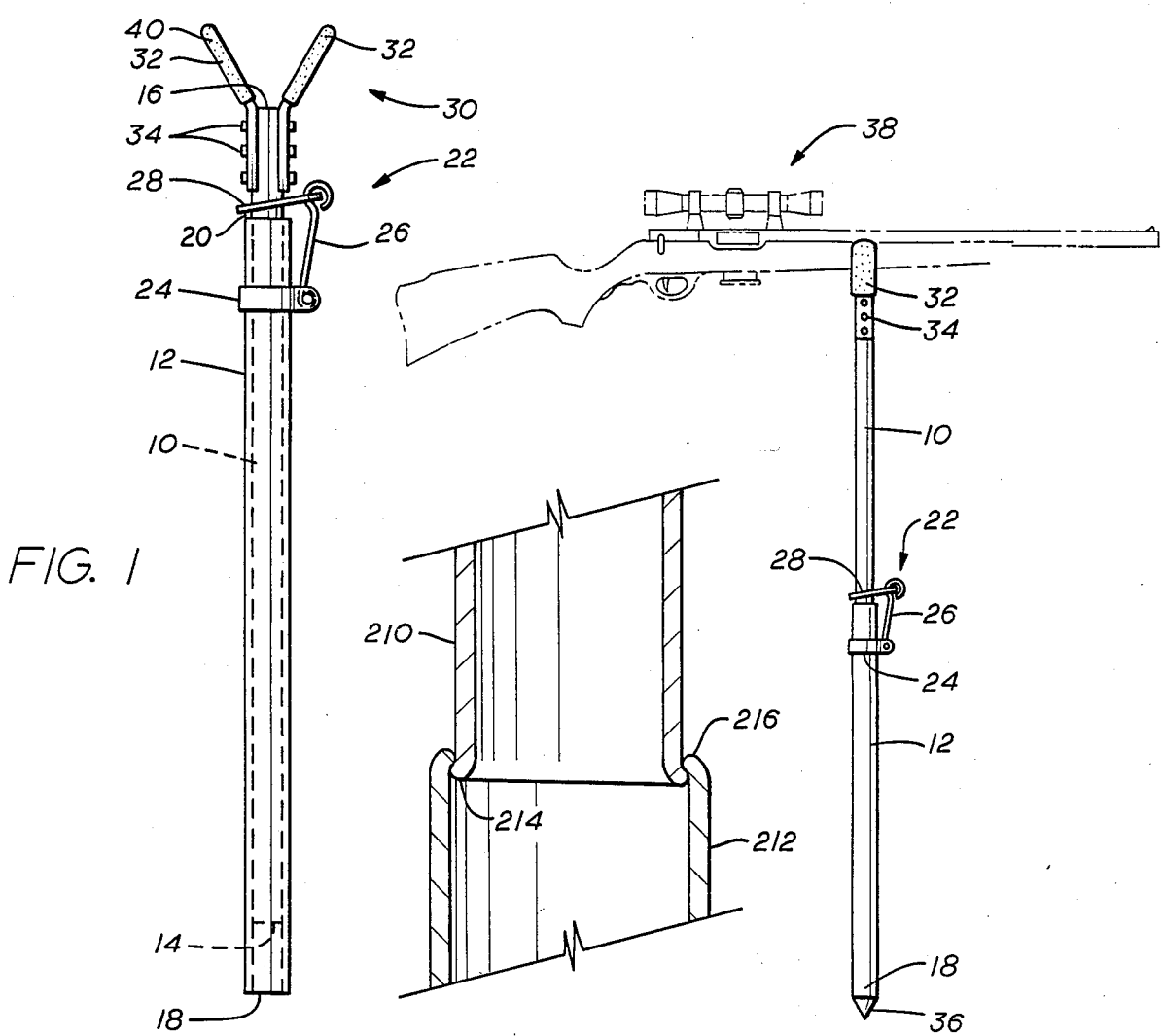
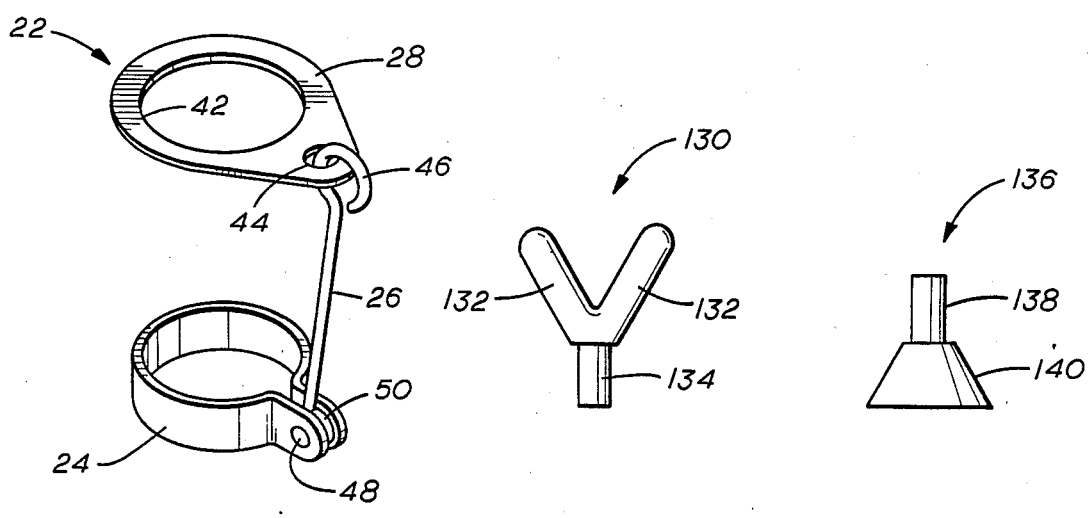

PORTABLE FIREARM SUPPORT

BACKGROUND OF THE INVENTION

1. Field of the Invention

The present invention relates to a portable firearm support which an individual may use to support any one of a variety of weapons, particularly small arms such as pistols, rifles and shotguns, in particular rifles, from a variety of firing positions.

2. Related Art

Benches such as shown in U.S. Pat. No. 4,438,581 are primarily intended for target shooting. U.S. Pat. No. 4,535,559 discloses a "portable" bench comprising a table, legs, a gun support assembly, a stool and legs with the intended purpose being to carry it to the field where it is assembled. The hunter in the field, either stalking or waiting at a stand however, cannot easily transport, nor conveniently set up and use such a bulky and cumbersome apparatus. There are however, a variety of gun rests of monopod, bipod and tripod configuration which may be used in the field.

It is well recognized that because of the accuracy and range of modern rifles and the sighting equipment, optimum marksmanship cannot be achieved when the rifle is supported and aimed totally by a person because the rifle cannot be held steady enough. Gun rests of varying design and configuration have been used since the advent of firearms. Most of the prior art gun rests were designed for military application, with the bipods having specific application to relatively heavy semi-automatic or automatic weapons intended to be fired from the prone position.

It is likely that the earliest known rest was a forked stick of selected length used to support the barrel of a gun while aiming and firing. Such rests were known and used in the orient, europe and this country as military equipment. There have been many proposed improvements on this simple design, for example, U.S. Pat. No. to 1,890,423, Teagarden discloses a telescoping spring biased rest with a spring loaded latch to secure the rest at the selected height; U.S. Pat. No. 3,327,422, to Harris which discloses a bipod adapted for attachment to a firearm and U.S. Pat. No. 4,345,398, to Picket, which discloses a telescoping monopod with a base plate and clamping means for securing a barrel thereon.

What an overview of the prior art suggests is that the simple forked stick was indeed too simple and generally the development in this art has been to develop complicated, large and bulky devices to replace the forked stick which worked, but was inconvenient because it had only a single length. Hence, several designs have employed telescoping leg(s), with various methods of adjusting and securing the telescoping leg at a desired length. Simplicity and speed of adjustment, silence and dependable performance are the essentials for a hunter's gun equipment.

It is an advantage that the present invention provides the dependable performance known for centuries as provided by the forked stick. It is a further advantage of the present invention that it is simple in its mechanical aspects, whereby breakdown or improper performance are substantially impossible. It is a particular feature of the present invention that it is rapidly adjustable to the desired height and readily collapsible to its compact travel form with only one hand, both very silently.

These and other advantages and features will become apparent from the following description.

SUMMARY OF THE INVENTION

Briefly, the present invention is a monopod telescoping firearm support with a Y or U shaped holding member at one end of one of the tubular members, which serves to receive the firearm and hold it, and a latch means which allows extension of tubular members but inhibits collapsing of the tubes. The latch means operates automatically when the monopod is in a substantially vertical position The latch means does not impede the extension and no action or operation on the part of the human operator is necessary to release the latch means to allow extension of the monopod. However, once extended the latch means is operational to inhibit the two tubular members from collapsing together. The relative position of one tubular member to the other, either rotationally or vertically, has no effect on the operation of the latch member and to release the latch member only one finger of one hand is required.

The latch member comprises a clamp, an arm pivotally attached to the clamp and a washer like member attached to the other end of the arm. The clamp is tightly attached to the lower tubular member and other (upper) tubular member passes through the washer. The pull of gravity keeps the washer down when the monopod is vertical, thereby preventing it from moving downward, but the same force of gravity prevents the washer from binding when the tubular members are being extended. The tubular member passing through the washer in the opposite direction to gravity is actually raising the washer slightly and passing through the opening, whereas when this tubular member presses down, e.g., during use, the washer binds against the tubular member and neither can move. However, by merely lifting the washer slightly the bind is released and the tubular members may be slid together.

BRIEF DESCRIPTION OF THE DRAWING

FIG. 1 is an elevational view of the present device in the collapsed position.

FIG. 2 is a detail of the latch mechanism for holding the present device in extended position.

FIG. 3 is an elevational view of the present device in extended position.

FIG. 4 is an alternative embodiment of a Y shaped member.

FIG. 5 is an alternative embodiment of an end member.

FIG. 6 is a cross sectional view of a detail of the means used to keep the two tubular members from separating.

DETAILED DESCRIPTION OF THE INVENTION

FIG. 1 shows the present portable firearm support in the closed position. Basically the device is comprised of two tubular members 10 and 12 nested together such that upper tubular member 10 is telescopically (i.e., slidably) seated inside of lower tubular member 12. Attached by screws, rivets or the like 34 to the distal end 16 of member 10 are two upwardly and outwardly extending arms 32 which form a Y shaped means 30 for receiving and holding a firearm.

Situated on the upper (proximal) end 20 of tubular member 12 is latch means 22 which consists of a clamp 24, which is affixed onto member 12. An arm 26 is pivotally attached to clamp 24 by rivet 48 through loop 50 at the lower end of arm 26. Another loop 46 is formed in the upper end of arm 26 and passes through opening 44 in washer like member 28, thereby allowing the washer like member 28 to pivot about the loop 46. The upper tubular member 10 passes through the washer like member 28 which is large enough to allow free movement of tubular member 10 therethrough. However, when the present device is upright and the latch means 22 is positioned as shown in FIGS. 1 and 3 the loose attachment of the arm 26 to the clamp 24 and to the washer like member, the pull of gravity causes the washer like member 28 to drop down. In this position the lower edge 42 of the washer like member 28 rests against the tubular member 10 and prevents the downward movement of that member and holds the present device in the extended position shown in FIG. 3. However, the latch mechanism 22 does not prevent moving the upper tubular member 10 upward, since gravity pulls the washer like member 28 downward each time it rises up to allow the member 10 to move up, thereby preventing the binding action in that direction.

The arms 32 are preferably covered with a soft covering 40 such as a polyethylene or any other strong durable plastic or resilient material, to prevent noise between these arms and the firearm 38 and to protect the firearm from scratches. Alternatively the two arms 32 may be replaced by a single unit such as the Y shaped member 130 shown in FIG. 4 which may be injection molded from suitable plastic material having a leg 134 adapted to fit tightly into the distal (top) end 16 of upper tubular member 10 and two upwardly and outwardly extending arms 132. The member 130 may be bolted, riveted or glued in place.

An end member 36 (a stake) may be inserted in the distal end 18 of lower tubular member 12. An alternative form of this member is shown in FIG. 5 where the end member is a footing 136 comprising a foot 140 and a shaft 138 to fit into the tubular member 12. Stake 18 has a similar shaft (not shown).

In one embodiment shown in FIG. 6, means are provided to prevent the two tubular members from inadvertently separating. The lower tubular member 212 has an inwardly turned annular bead 216 about its proximal end 20 and upper tubular member 210 has an outwardly extending annular bead 214 about its proximal end 14. The two beads come together and prevent further movement of the tubular members.

The invention claimed is:

1. A firearm support comprising a pair of telescopically engaged tubular members, a firearm receiving and holding means located on the distal end of an upper tubular member of said pair and a latch means affixed to a lower tubular member of said pair, said latch means allowing unrestricted extension of said telescopic tubes and preventing collapse of said tubular members together by operation of gravity thereon wherein said latch means comprises a clamp affixed to said lower tubular member, an arm pivotally attached to said clamp and a washer like element pivotally attached to the distal end of said arm.

2. The firearm support according to claim 1 wherein said upper tubular member is nested inside of said lower tubular member.

3. The firearm support according to claim 2 wherein said receiving and holding means is generally Y shaped.

4. The firearm support according to claim 3 wherein said receiving and holding means comprises two generally outwardly extending opposed arms.

5. The firearm support according to claim 3 wherein said receiving and holding means comprises a unitary generally Y shaped structure attached to said tubular structure.

6. The firearm support according to claim 5 wherein said unitary structure is attached to said tubular member by seating the leg of said Y into said tubular member.

7. The firearm support according to claim 3 wherein a footing means is located on the distal end of said lower tubular member.

8. The firearm support according to claim 3 wherein said upper tubular member passes through said washer like element.

9. The firearm support according to claim 8 wherein the opening in said washer line element is of sufficient large diameter to allow said upper tubular member to pass freely therethrough.

10. The firearm support according to claim 9 wherein said receiving and holding means comprises two generally outwardly extending opposed arms.

11. The firearm support according to claim 9 wherein said receiving and holding means comprises a unitary generally Y shaped structure attached to said tubular structure, and said unitary structure is attached to said tubular member by seating the leg of said Y into said tubular member.

12. The firearm support according to claim 9 wherein a footing means is located on the distal end of said lower tubular member.

13. The firearm support according to claim 9 wherein means are provided to prevent separation of said tubular members.

14. The firearm support according to claim 13 wherein said means to prevent separation comprises an outwardly extending lip on the proximal end of said upper tubular member and an inwardly extending lip on the proximal end of said lower tubular member.

15. The firearm support according to claim 14 wherein said lips are annular.

16. The firearm support according to claim 1 wherein said upper tubular member passes through said washer like element.

17. The firearm support according to claim 16 wherein the opening in said washer like element is of sufficiently large diameter to allow said upper tubular member to pass freely therethrough.

18. The firearm support according to claim 1 wherein means are provided to prevent separation of said tubular members.

19. The firearm support according to claim 18 wherein said means to prevent separation comprises an outwardly extending lip on the proximal end of said upper tubular member and an inwardly extending lip on the proximal end of said lower tubular member.

20. The firearm support according to claim 19 wherein said lips are annular.

* * * * *